United States Patent
Yamamoto et al.

(10) Patent No.: US 7,150,840 B2
(45) Date of Patent: Dec. 19, 2006

(54) GRAPHITE FINE CARBON FIBER, AND PRODUCTION METHOD AND USE THEREOF

(75) Inventors: Ryuji Yamamoto, Kanagawa (JP); Akinori Sudoh, Kanagawa (JP)

(73) Assignee: Showa Denko K.K., Tokyo (JP)

( * ) Notice: Subject to any disclaimer, the term of this patent is extended or adjusted under 35 U.S.C. 154(b) by 345 days.

(21) Appl. No.: 10/648,366

(22) Filed: Aug. 27, 2003

(65) Prior Publication Data

US 2004/0041130 A1   Mar. 4, 2004

Related U.S. Application Data

(60) Provisional application No. 60/407,704, filed on Sep. 4, 2002.

(30) Foreign Application Priority Data

Aug. 29, 2002 (JP) .......................... P2002-250169

(51) Int. Cl.
- *D01F 9/127* (2006.01)
- *B32B 1/00* (2006.01)
- *C01B 31/02* (2006.01)
- *H01M 4/96* (2006.01)

(52) U.S. Cl. ...................... 252/500; 252/502; 428/367; 428/398; 428/408; 423/445 B; 423/447.5; 423/447.1; 429/231.8; 977/741; 977/743; 977/843; 977/848

(58) Field of Classification Search ................ 252/502, 252/503, 500; 428/367, 922, 398, 408; 423/445 B, 423/447.5, 447.1; 429/231.8; 977/741, 977/743, 843, 848
See application file for complete search history.

(56) References Cited

U.S. PATENT DOCUMENTS

| | | | | |
|---|---|---|---|---|
| 4,816,289 A | * | 3/1989 | Komatsu et al. | ......... 423/447.3 |
| 5,165,909 A | * | 11/1992 | Tennent et al. | .......... 423/447.3 |
| 6,489,026 B1 | * | 12/2002 | Nishimura et al. | ......... 428/367 |
| 6,565,971 B1 | | 5/2003 | Morita et al. | |
| 6,654,229 B1 | * | 11/2003 | Yanagisawa et al. | ....... 361/502 |

FOREIGN PATENT DOCUMENTS

| | | | |
|---|---|---|---|
| JP | 60-027700 A | | 2/1985 |
| JP | 60-054998 A | | 3/1985 |
| JP | 64-065144 A | | 3/1989 |
| JP | 06-073615 A | | 3/1994 |
| JP | 06-081218 A | | 3/1994 |
| JP | 06-084517 | * | 3/1994 |
| JP | 06-084517 A | | 3/1994 |
| JP | 07-150419 A | | 6/1995 |
| JP | 11-250911 A | | 9/1999 |
| JP | 11-322314 A | | 11/1999 |
| JP | 2002-146634 | * | 5/2002 |
| JP | 2002-146634 A | | 5/2002 |
| WO | WO 00/58536 | * | 10/2000 |

\* cited by examiner

*Primary Examiner*—Mark Kopec
*Assistant Examiner*—Kallambella Vijayakumar
(74) *Attorney, Agent, or Firm*—Sughrue Mion PLLC (57) ABSTRACT

A graphitized fine carbon fiber comprising a hollow space extending along its center axis, and a plurality of graphene sheets, wherein the fiber has an end surface comprising a portion of discontinuity in which ends of graphene sheets are not bonded to one another and at least one portion of continuity comprised of at least one group of graphene sheets in which one graphene sheet is bonded to another graphene sheet adjacent thereto.

22 Claims, 3 Drawing Sheets

Fig. 1

-- Prior Art --

Fig. 2

-- Prior Art --

GRAPHITE FINE CARBON FIBER, AND PRODUCTION METHOD AND USE THEREOF

CROSS-REFERENCE TO RELATED APPLICATIONS

This application claims benefit of Provisional Application No. 60/407,704, filed Sep. 4, 2002, incorporated herein by reference, under 35 U.S.C. § 111(b) pursuant to 35 U.S.C. § 119(e) (1).

BACKGROUND OF THE INVENTION

1. Field of the Invention

The present invention relates to graphitized fine carbon fiber which can be uniformly dispersed in a matrix formed of, for example, resin, ceramic, or metal, and which exhibits high affinity with resin; and to a method for producing the graphitized fine carbon fiber.

More particularly, the present invention relates to graphitized fine carbon fiber which exhibits excellent affinity with resin, dispersibility, and deterioration resistance, and which can impart high surface smoothness to a composite material, the carbon fiber being produced by grinding vapor grown carbon fiber, and then thermally treating the thus-ground carbon fiber at a temperature of at least 2,000° C. in an inert atmosphere; and to a method for producing the graphitized fine carbon fiber.

The present invention also relates to graphitized fine carbon fiber which is useful as a filler material for improving electrical conductivity and thermal conductivity, as an electron emission material for producing field emission displays (FEDs), as a medium for sorption of hydrogen, methane, or various other gasses, and as a material employed in, for example, transparent electrodes, electromagnetic wave shielding materials, and secondary batteries; and to a method for producing the graphitized fine carbon fiber.

The present invention also relates to a battery electrode exhibiting improved charge/discharge capacity and strength, which is produced through incorporation of the graphitized fine carbon fiber into an electrically conductive substrate or through application of the carbon fiber onto the substrate, the battery electrode being employed as a positive or negative electrode of any of a variety of secondary batteries such as dry batteries, Pb storage batteries, capacitors, and recently developed Li-ion secondary batteries.

2. Background Art

Carbon fiber is used in a variety of composite materials, by virtue of its excellent properties such as high strength, high elastic modulus, and high electrical conductivity. In recent years, in conjunction with developments in electronic techniques, carbon fiber has been considered a promising electrically conductive filler for producing electromagnetic wave shielding materials or antistatic materials, and has been viewed as a useful antistatic filler which can be incorporated into resin or as a promising filler employed in transparent electrically conductive resin. Also, by virtue of its excellent tribological characteristics and high wear resistance, carbon fiber has been considered a promising material for use in, for example, electric brushes and variable resistors. In addition, carbon fiber has become of interest as a wiring material for producing devices such as LSIs, since it exhibits high electrical conductivity, thermal conductivity resistance, and electromigration resistance.

Conventional carbon fiber produced through carbonization of organic fiber by means of heat treatment in an inert atmosphere, such as polyacrylonitrile (PAN)-based carbon fiber, pitch-based carbon fiber, or cellulose carbon fiber, has a relatively large diameter; i.e., 5 to 10 μm, and exhibits poor electrical conductivity. Therefore, such carbon fiber has been widely employed as a reinforcement material in, for example, resin or ceramic.

In the 1980's, studies were conducted on a process for producing vapor grown carbon fiber through thermal decomposition of a gas of, for example, hydrocarbon in the presence of a transition metal catalyst. Through such a process, vapor grown carbon fiber having a diameter of about 0.1 to about 0.2 μm (about 100 to about 200 nm) and an aspect ratio of about 10 to about 500 has been produced. A variety of processes for producing vapor grown carbon fiber are disclosed, including a process in which an organic compound such as benzene, serving as a raw material, and an organo-transition metallic compound such as ferrocene, serving as a catalyst, are introduced into a high-temperature reaction furnace together with a carrier gas, to thereby produce vapor grown carbon fiber on a substrate (Japanese Patent Application Laid-Open (kokai) No. 60-27700); a process in which vapor grown carbon fiber is produced in a dispersed state (Japanese Patent Application Laid-Open (kokai) No. 60-54998); and a process in which vapor grown carbon fiber is grown on a reaction furnace wall (Japanese Patent Application Laid-Open (kokai) No. 7-150419).

Since vapor grown carbon fiber is formed of carbon which is readily graphitized, when the carbon fiber is subjected to heat treatment at 2,000° C. or higher, the resultant carbon fiber exhibits excellent crystallinity and improved electrical conductivity. Therefore, the thus-graphitized carbon fiber is employed as an electrically conductive filler material in, for example, a resin or a secondary battery.

A characteristic feature of a vapor grown carbon fiber resides in its shape and crystal structure. The vapor grown carbon fiber has a cylindrical structure including a very thin hollow space in its center portion, and a plurality of graphene sheets (carbon hexagonal network layers) grown around the hollow space so as to form annualar-ring-like tubes. When vapor grown carbon fiber is subjected to heat treatment at 2,000° C. or higher, the cross section of the thus-treated carbon fiber assumes a polygonal shape, and in some cases, micropores are formed in the interior of the fiber.

Since vapor grown carbon fiber has a small diameter, the carbon fiber has a relatively high aspect ratio. Generally, the carbon fibers are entangled with one another to form agglomerates.

Since vapor grown carbon fibers are entangled with one another to form agglomerates, when the carbon fiber is mixed with a matrix formed of, for example, resin or ceramic, the carbon fiber fails to be uniformly dispersed in the matrix, and thus electrical, thermal, and mechanical characteristics of interest cannot be obtained.

In addition, such agglomerated carbon fiber having low bulk density encounters difficulty in kneading with resin. When the surface of the resultant composite material is observed under a scanning electron microscope, the composite material is found to have a "hairy" surface, including pieces of the carbon fiber covered with no resin. When the composite material is employed as an antistatic material for producing, for example, an integrated circuit (IC) tray, due to generation of microscratches at a point at which the tray is in contact with a disk or wafer, the quality of the disk or wafer is lowered, and the yield of a final product is reduced.

Conventionally, various attempts have been made to reduce the length of long carbon fiber through grinding, in order to improve dispersibility of the carbon fiber and to obtain a composite material of smooth surface in relation to the use as a filler, and to produce cut surfaces of the carbon fiber capable of promoting the rate of generation of an intercalate compound in relation to the use of the carbon fiber as a battery material. Conventionally, carbon fiber has been ground through dry grinding by use of, for example, a ball mill, to thereby form short carbon fiber (Japanese Patent Application Laid-Open (kokai) Nos. 1-65144 and 11-322314). However, grinding of carbon fiber through dry grinding involves the following problems. When carbon fiber is ground by use of a ball mill, fine carbon fiber fragments generated through grinding form agglomerates in the mill or the fragments are bonded together, and thus the carbon fiber fails to be micronized efficiently even if grinding is performed for a long period of time. In addition, the resultant carbon fiber fragments have a length as large as about 2 to about 3 μm. When carbon fiber is ground by use of a rod mill, although entangled carbon fibers are fragmented, difficulty is encountered in reducing the length of carbon fiber fragments to 30 μm or less. Meanwhile, wet grinding by use of a bead mill enables highly efficient grinding of carbon fiber. However, wet grinding requires processes subsequent to grinding of carbon fiber, including removal of a dispersant, drying of a solvent, and fragmentation of dried and agglomerated carbon fibers, and thus production cost increases.

When graphite carbon fiber is employed as a grinding raw material (Japanese Patent Application Laid-Open (kokai) Nos. 6-73615, 6-81218, 6-84517, and 11-250911), efficient and uniform grinding of the graphite carbon fiber cannot be performed through dry grinding or wet grinding, since the carbon fiber has high strength attributed to its high crystallinity. In addition, grinding of graphite carbon fiber involves problems, including contamination of the ground carbon fiber with impurities derived from grinding media, and treatment of such impurities.

Since ground carbon fiber has highly active cut surfaces, the carbon fiber tends to interact with a matrix formed of resin, and adhesion between the carbon fiber serving as a filler and the matrix is lowered due to, for example, deterioration of the resin. As a result, the electrical conductivity and thermal conductivity of a composite material are lowered.

Japanese Patent Application Laid-Open (kokai) No. 2002-146634 discloses carbon fiber, each fiber filament of the carbon fiber having a closed end surface. However, this publication does not disclose a carbon fiber filament having a closed end surface and a cut surface.

SUMMARY OF THE INVENTION

In view of the foregoing, an object of the present invention is to provide a graphitized fine carbon fiber which, when mixed with a matrix formed of resin or a similar material, exhibits excellent dispersibility, adhesion, deterioration resistance, electrical conductivity, and thermal conductivity, the graphitized fine carbon fiber being produced by grinding carbon fiber of low crystallinity, serving as a raw material, such that the ground carbon fiber has a predetermined length, and then thermally treating the thus-ground carbon fiber at a temperature of at least 2,000° C. A characteristic feature of the graphitized fine carbon fiber of the present invention resides in that the carbon fiber includes a hollow space extending along its center axis and a plurality of graphene sheets; has an end surface including a portion of discontinuity in which ends of graphene sheets are not bonded to one another and at least one portion of continuity comprised of at least one group of graphene sheets in which one graphene sheet is bonded to another graphene sheet adjacent thereto. The graphitized fine carbon fiber of the present invention preferably has a BET specific surface area of at least 4 m$^2$/g, an outer diameter of 2 to 500 nm, and an aspect ratio of 1 to 50.

The deterioration resistance of a resin or an electrolytic solution can be improved by reducing the active points of carbon fiber and the amount of metallic impurities.

Grinding of carbon fiber produces cut surfaces having reactive dangling bonds (i.e., unsaturated covalent bonds). When the thus-ground carbon fiber is employed for producing, for example, a battery, an electrolytic solution is decomposed at the active surfaces, and thus repeated charge/discharge characteristics are deteriorated. Meanwhile, impurities generated from grinding media cause deterioration of a resin, and mechanical strength of the carbon fiber resin is lowered.

In order to solve the aforementioned problems, the present inventors have performed studies on a process in which carbon fiber is ground, and the thus-ground carbon fiber is subjected to heat treatment at high temperature so as to enhance crystallinity, with impurities being removed; and have found that low crystalline carbon fiber which has not undergone heat treatment can be ground at high efficiency and high yield, and that graphitized fine carbon fiber produced through graphitization of the thus-ground carbon fiber has a specific structural feature.

Accordingly, the present invention provides the following.

1) A graphitized fine carbon fiber comprising a hollow space extending along its center axis, and a plurality of graphene sheets, wherein the fiber has an end surface comprising a portion of discontinuity in which ends of graphene sheets are not bonded to one another and at least one portion of continuity comprised of one group of one graphene sheet is bonded to another graphene sheet adjacent thereto;

2) A graphitized fine carbon fiber according to 1) above, wherein the portion of continuity comprises a bent portion formed of at least three groups of graphene sheets in which one graphene sheet is bonded to another graphene sheet adjacent thereto;

3) A graphitized fine carbon fiber according to 1) or 2) above, wherein the portion of continuity is present at the periphery of the fiber;

4) A graphitized fine carbon fiber according to any one of 1) through 3) above, wherein, at the end surface of the fiber, the area of a region formed of the portion of discontinuity is smaller than that of a region formed of the portion of continuity;

5) A graphitized fine carbon fiber according to any one of 1) through 4) above, wherein the fiber has a BET specific surface area of at least 4 m$^2$/g, an outer diameter of 2 to 500 nm, and an aspect ratio of 1 to 50;

6) A graphitized fine carbon fiber according to any one of 1) through 5) above, wherein the fiber has at least one region at which the hollow space is partially closed (a fiber that has at least one region at which the hollow space is partially closed and a method for producing it are described in copending U.S. application Ser. No. 10/231,290, filed Aug. 30, 2002, the disclosure of which is hereby incorporated by reference);

7) A graphitized fine carbon fiber according to any one of 1) through 6) above, wherein the fiber contains boron or a boron compound between carbon crystal layers or on a carbon crystal layer, and the ratio of peak height (Id) at a band of 1,341 to 1,349 cm$^{-1}$ of a Raman spectrum of the fiber to peak height (Ig) at a band of 1,570 to 1,578 cm$^{-1}$ of the Raman spectrum; i.e., Id/Ig, is 0.1 to 1;

8) A graphitized fine carbon fiber according to 7) above, wherein the fiber contains boron (B) between carbon crystal layers in an amount of 0.01 to 5 mass %;

9) A method for producing a graphitized fine carbon fiber as recited in any one of 1) through 8) above, which comprises grinding carbon fiber in which the interlayer distance (d002) of carbon hexagonal network layers (002) as measured through X-ray diffraction is at least 0.345 nm, and the ratio of peak height (Id) at a band of 1,341 to 1,349 cm$^{-1}$ of a Raman spectrum of the carbon fiber to peak height (Ig) at a band of 1,570 to 1,578 cm$^{-1}$ of the Raman spectrum; i.e., Id/Ig, is at least 1; and thermally treating the thus-ground carbon fiber at a temperature of about 2,000 to about 3,000° C. in an inert gas atmosphere;

10) A method for producing a graphitized fine carbon fiber as recited in any one of 1) through 8) above, which comprises grinding vapor grown carbon fiber produced through thermal decomposition of a hydrocarbon, or carbon fiber obtained through heat treatment of the vapor grown carbon fiber at a temperature of about 600 to about 1,300° C. in an inert gas atmosphere; and thermally treating the thus-ground carbon fiber at a temperature of about 2,000 to about 3,000° C. in an inert gas atmosphere;

11) A method for producing a graphitized fine carbon fiber according to 9) or 10) above, wherein the carbon fiber is ground by means of impact grinding employing impact force and dry grinding performed in the presence of neither water nor an organic solvent;

12) A method for producing a graphitized fine carbon fiber according to 10) or 11) above, wherein the vapor grown carbon fiber contains branched vapor grown carbon fiber, and the vapor grown carbon fiber has an outer diameter of 2 to 500 nm and an aspect ratio of 10 to 15,000;

13) A method for producing a graphitized fine carbon fiber according to any one of 9) through 12) above, wherein, when the carbon fiber is thermally treated at a temperature of about 2,000 to about 3,000° C. in an inert gas atmosphere, a boron compound is added to the carbon fiber;

14) A graphitized fine carbon fiber mixture comprising a graphitized fine carbon fiber as recited in any one of 1) through 8) above in an amount of 5 vol % to 90 vol % on the basis of the entirety of the mixture;

15) A graphitized fine carbon fiber composition comprising a graphitized fine carbon fiber as recited in any one of 1) through 8) above;

16) A graphitized fine carbon fiber composition comprising a graphitized fine carbon fiber as recited in any one of 1) through 8) above in an amount of 5 to 90 mass %, the composition being a resin composition;

17) An electrically conductive material comprising a graphitized fine carbon fiber composition as recited in 15) or 16) above;

18) A secondary battery comprising, as an electrode material, a graphitized fine carbon fiber composition as recited in 15) or 16) above; and 19) A gas occlusion material comprising a graphitized fine carbon fiber composition as recited in 15) or 16) above.

DETAILED DESCRIPTION OF THE INVENTION

The present invention will next be described in detail.

In order to obtain carbon fiber exhibiting excellent dispersibility in resin, adhesion, and deterioration resistance, the present inventors have performed extensive studies on grinding and heat treatment conditions for vapor grown fine carbon fiber, and have found that graphitized fine carbon fiber having a conventionally unknown structure is produced under specific conditions. A characteristic feature of the graphitized fine carbon fiber of the present invention resides in that the carbon fiber comprises a hollow space extending along its center axis, and a plurality of graphene sheets, wherein the fiber has an end surface comprising a portion of discontinuity in which ends of graphene sheets are not bonded to one another and at least one portion of continuity in which at least one group of graphene sheets in which one graphene sheet is bonded to another graphene sheet adjacent thereto.

The graphitized fine carbon fiber of the present invention may be employed as a transparent electrode filler or a hydrogen occlusion material, but use of the carbon fiber is not limited thereto; the carbon fiber may also be employed as an electromagnetic wave shielding material, as a material for imparting electrical conductivity to, for example, a secondary battery, and as a thermally conductive filler. The carbon fiber may also be employed as a material for imparting electrical conductivity to the surface of, for example, an OPC (Organic Photo Conductor) drum or a printed circuit board.

The graphitized fine carbon fiber of the present invention is dispersed in a resin to thereby prepare an electrically conductive plastic paste. The resultant paste may be employed as a printing resistor, a planar heater, an antistatic paint, an electromagnetic wave shielding paint, or an electrically conductive paste.

Figure 1:
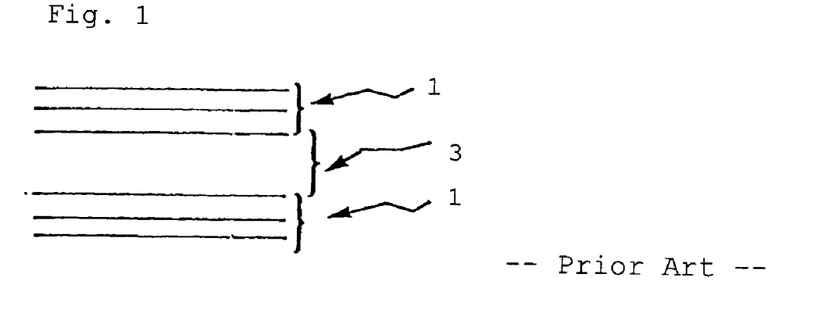
FIG. 1 is a schematic cross-sectional view showing the structure of a conventional fine carbon fiber.
Figure 2:
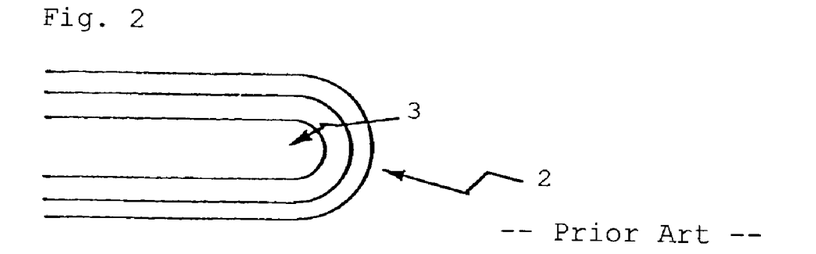
FIG. 2 is a schematic cross-sectional view showing the structure of another conventional fine carbon fiber.
Figure 3:
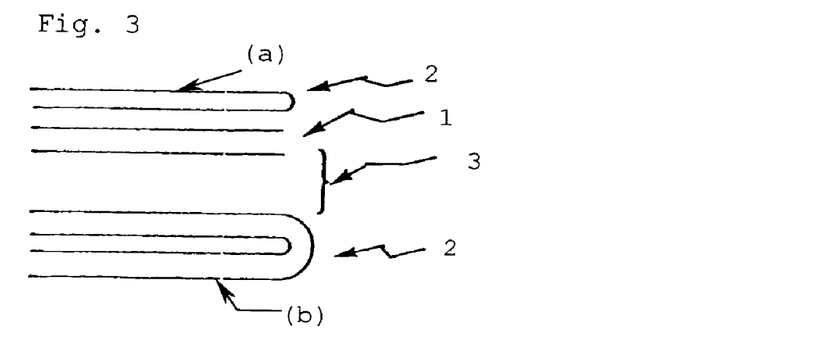
FIG. 3 is a schematic cross-sectional view illustrating the structure of one embodiment of a graphitized fine carbon fiber of the present invention.
Figure 4:
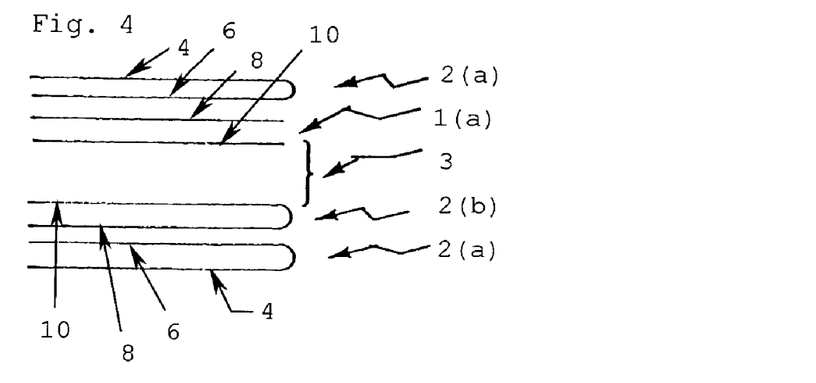
FIG. 4 is a schematic cross-sectional view illustrating the structure of another embodiment of a graphitized fine carbon fiber of the present invention.

The graphitized fine carbon fiber of the present invention will next be described. Characteristic features of the graphitized fine carbon fiber of the present invention will be described with reference to the drawings (FIGS. 1 through 10). In these Figs., solid lines schematically represent graphene sheets (i.e., layers of graphite or layers of crystals of graphite-like carbon). As shown in schematic cross-sectional views of FIGS. 1 and 2, conventional fine carbon fiber has a structure including a portion of discontinuity 1 in which ends of graphene sheets are not bonded to one another, and a hollow space 3; or a structure including a portion of continuity 2 in which graphene sheets are bonded to one another, and a hollow space 3. Meanwhile, as shown in FIGS. 3 and 4, the graphitized fine carbon fiber of the present invention produced through a vapor growth process has an end surface including a portion of discontinuity 1 in which ends of graphene sheets are not bonded to one another, and a portion of continuity 2 in which at least one group of one graphene sheet is bonded to another graphene sheet adjacent thereto, and includes a hollow space 3. Preferably, the graphitized fine carbon fiber has a BET specific surface area of at least 4 $m^2/g$, an outer diameter of 2 to 500 nm, and an aspect ratio of 1 to 50. The end surface, which is a surface resulting from fracture, is produced through, for example, grinding of carbon fiber. At the portion of discontinuity in the end surface, continuity of a graphene sheet is lost, and carbon atoms at the edged sites of defects of the basal plane and carbon atoms at the edged sites of boundaries between crystallites are exposed. The end surface is virtually perpendicular to the center axis of the fiber. The graphitized fine carbon fiber has a low aspect ratio (i.e., an aspect ratio of 1 to 50) and includes a hollow space and has a multi-layer structure (annular-ring-like-tube structure).

In FIG. 3, there is shown two portions of continuity 2, one portion (a) in which one group of two graphene sheets are bonded to each other at the end of the carbon fiber, and another portion (b) comprised of two groups of graphene sheets, with each group comprised of two graphene sheets bonded to each other at the end of the carbon fiber. Portion (b) comprises four graphene sheets, with the outermost and innermost sheets bonded to each other at the end of the carbon fiber to form one group, and two interior graphene sheets which are bonded to each other at the end of the graphite fiber to form a second group. In FIG. 3, there is shown a portion of discontinuity 1 in which ends of two graphene sheets are not bonded to one another.

FIG. 4 shows a structure at one end of a four-layer carbon fiber comprised of graphene sheets 4, 6, 8, and 10. In FIG. 4, there is shown one portion of continuity 2(*a*) formed of graphene sheets 4 and 6 that are bonded to each other at their ends, a second portion of continuity 2(*b*) where graphene sheets 8 and 10 are bonded to each other at their ends and a portion of discontinuity 1(*a*) where the graphene sheets 8 and 10 are not bonded at their ends. Each of the two portions of continuity are comprised of two graphene sheets which are bonded to each other at the end of the carbon fiber.

In FIG. 4, the carbon fiber is constituted by two inner graphene sheets 8 and 10 with their end parts being not closed at one portion of the carbon fiber but being closed at another portion of the carbon fiber, two outer graphene sheets 4 and 6 that are bonded to each other at their end parts to form a closed end part, and a hollow. It is seen that the graphene sheets 4 and 6 that form the outer two layers are closed throughout the circumference, whereas the graphene sheets 8 and 10 as the inner two layers are not closed uniformly in the circumferential direction due to introduction of a defect or the like.

Figure 5:
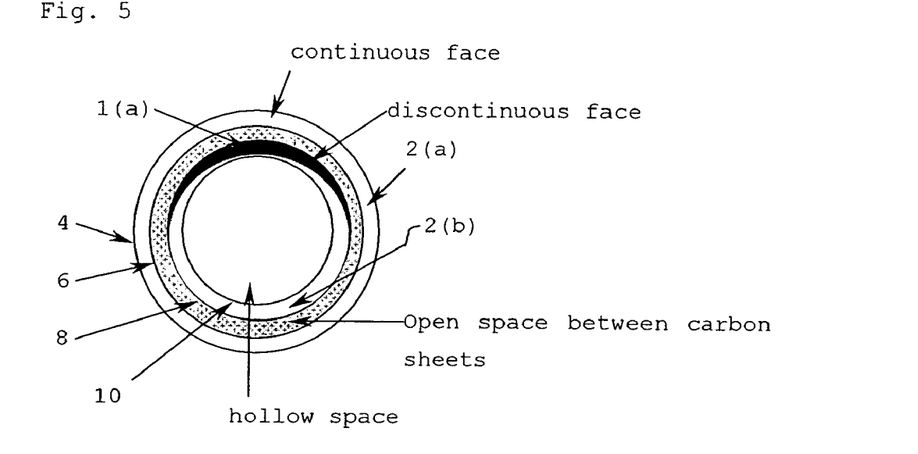
FIG. 5 shows a cross-section seen from the end face of the fine carbon fiber of FIG. 4.

This is further illustrated in FIG. 5 which shows a cross section of FIG. 4 seen from an end face of the carbon fiber of FIG. 4, where the white portion indicates that one graphene sheet is combined with another graphene sheet to form a continuous face, and the black portion indicates that a graphene sheet is not combined with another graphene sheet and a discontinuous face is present. The continuous face (cross section in the longitudinal direction of fiber) of graphene sheet, which is present at both ends or one end of a fine carbon fiber, is ideally continuous also in the circumferential direction. However, due to the effect of grinding defect, heat treatment temperature or impurity components other than carbon, discontinuity is sometimes generated in the circumferential direction. The end of the carbon fiber between graphene sheets 6 and 8 is open and is indicated by the mottled portion in FIG. 5.

Figure 6:
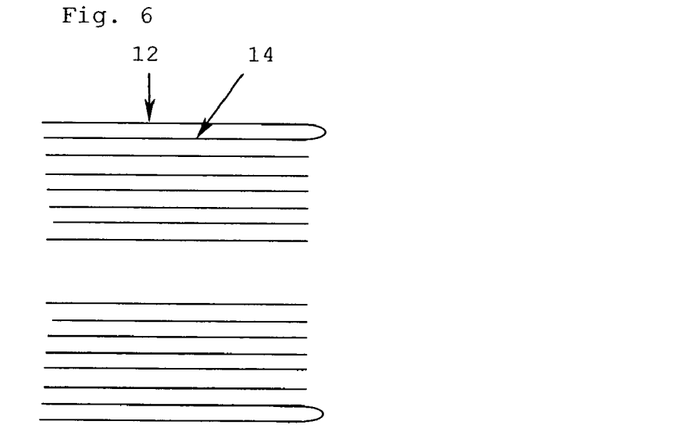
FIG. 6 is a schematic cross-sectional view illustrating still another embodiment of a graphitized fine carbon fiber of the present invention.

In FIG. 6, a carbon fiber is shown in which one graphene sheet 12 combines with an adjacent one graphene sheet 14 at their end parts to form a portion of continuity comprised of a single group of two graphene sheets bonded at their ends.

Figure 7:
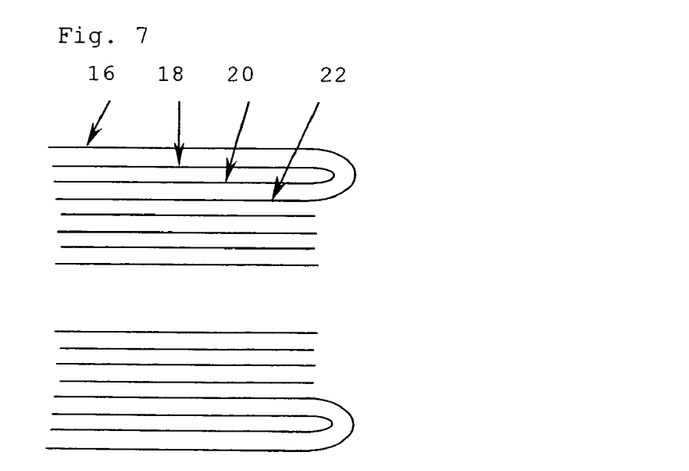
FIG. 7 is a schematic cross-sectional view illustrating a further embodiment of a graphitized fine carbon fiber of the present invention.

In FIG. 7, a carbon fiber is shown in which two graphene sheets 16 and 18 combine with two graphene sheets 20 and 22 adjacent thereto, respectively, at their end parts, to form a portion of continuity comprised of two groups of graphene sheets, with each group comprised of one graphene sheet bonded to another graphene sheet at their ends.

Figure 8:
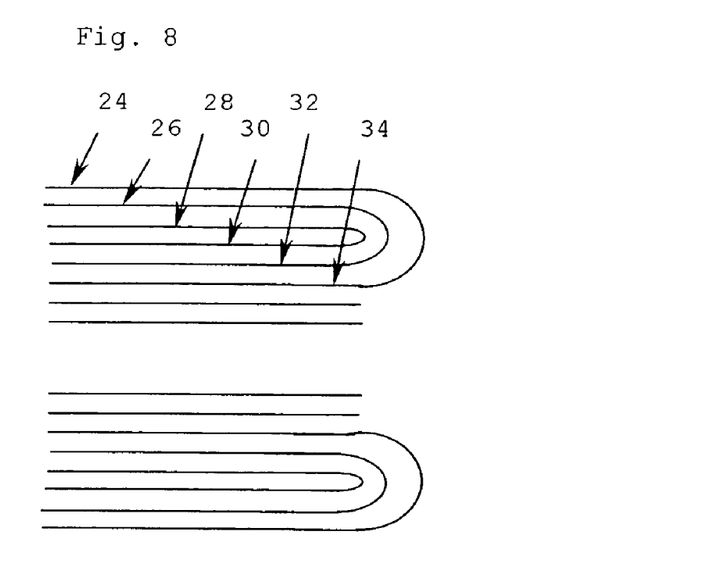
FIG. 8 is a schematic cross-sectional view illustrating yet another embodiment of a graphitized fine carbon fiber of the present invention.

In FIG. 8, a carbon fiber shown in which three graphene sheets 24, 26 and 28 combine with three graphene sheets 30, 32 and 34 adjacent thereto, respectively, at their end parts to form a portion of continuity comprised of three groups of graphene sheets, with each group comprised of one graphene sheet bonded to another graphene sheet at their ends.

In a conventional vapor grown carbon fiber, both ends of one vapor grown carbon fiber usually are closed. When this vapor grown carbon fiber is ground, the resulting carbon fiber includes a carbon fiber with one end being closed and another end having the structure of the present invention, and a carbon fiber having the structure of the present invention at both ends. It is estimated that the carbon fiber having the structure of the present invention at both ends occupies an overwhelmingly large majority, though this varies depending on the degree of grinding.

Figure 9:
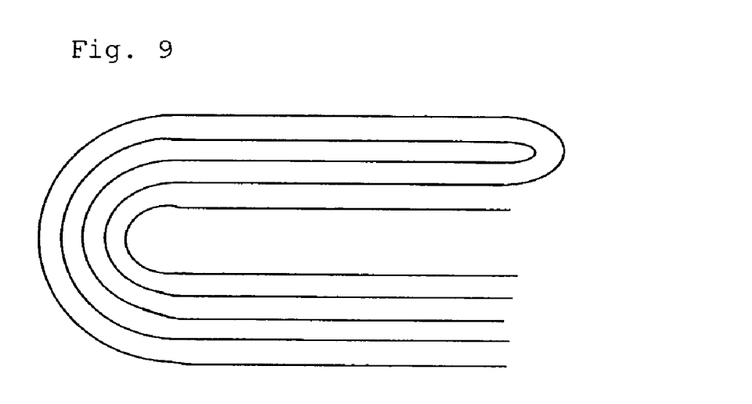
FIG. 9 is a cross-sectional view of another embodiment of a graphitized fine carbon fiber of the present invention.

FIG. 9 shows the structure of a ground vapor grown carbon fiber having the structure of the present invention at one end.

Figure 10:
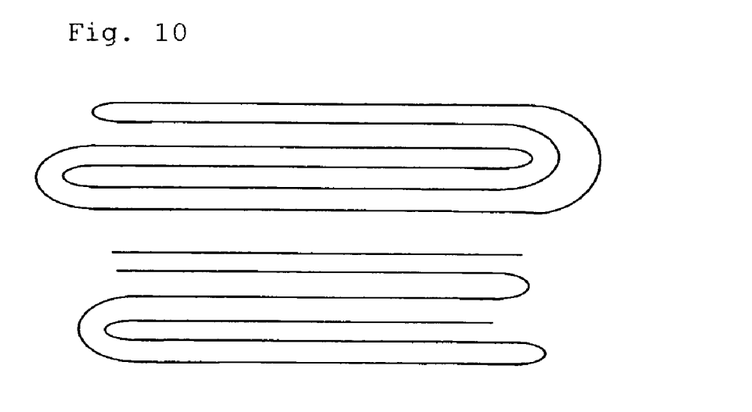
FIG. 10 is a cross-sectional view of still another embodiment of a graphitized fine carbon fiber of the present invention.

FIG. 10 shows the structure of a ground vapor grown carbon fiber having the structure of the present invention at both ends.

The portion of continuity, which is present in the end surface, is produced through the following procedure: defects are generated in layered graphene sheets through thermal chemical vapor deposition (CVD), regularity in the carbon arrangement of the graphene sheets is lost, and adjacent graphene sheets are bonded together; or an end of a graphene sheet which is broken through heat treatment at a temperature of 2,000° C. or higher is bonded to an end of another graphene sheet. A bent portion of the portion of continuity contains at least one group of one graphene sheet bonded to another graphene sheet at the end of the fiber. When the number of groups of graphene sheets contained in the bent portion is small; i.e., when the curvature radius of the bent portion is small, the surface energy of the bent portion becomes large, and stability of the bent portion may fail to be maintained. Therefore, the number of groups of one graphene sheet bonded to another graphene sheet contained in the bent portion is preferably at least three, as shown, for example, in FIG. 8, more preferably at least five, much more preferably 5 to 10.

The portion of continuity in which at least one graphene sheet is bonded to another graphene sheet adjacent thereto is present at the periphery of the graphitized fine carbon fiber of the present invention. Therefore, reactive dangling bonds produced through grinding of carbon fiber are reduced at an end of the fiber, and the graphitized fine carbon fiber enables suppression of decomposition of, for example, an electrolytic solution.

At an end of the graphitized fine carbon fiber of the present invention, the area of a region formed of the portion of discontinuity in which ends of graphene sheets are not bonded to one another is smaller than that of a region formed of the portion of continuity in which at least one graphene sheet is bonded to another graphene sheet adjacent thereto. Therefore, the graphitized fine carbon fiber can intercalate ions at the portion of discontinuity, and can suppress decomposition of an electrolytic solution. When the number of portions of continuity is large, decomposition of an electrolytic solution can be suppressed, but ion intercalation performance is lowered. Therefore, at an end of the fiber, the ratio of the area of a region formed of the portion of discontinuity to that of a region formed of the portion of continuity is preferably less than 1, more preferably 0.8 to 0.1.

The graphitized fine carbon fiber of the present invention can be produced through, for example, the following procedure: vapor grown carbon fiber, preferably carbon fiber containing branched carbon fiber, is ground by use of, for example, a vibration mill, and the thus-ground carbon fiber is thermally treated at 2,800° C. in an inert atmosphere. A branched vapor grown carbon fiber and a method for producing it are described in copending U.S. application Ser. No. 10/451,080, filed Jun. 19, 2003, the disclosure of which is hereby incorporated by reference.

The carbon fiber employed in the present invention is generally produced through thermal decomposition of an organic compound in the presence of an organo-transition metallic compound.

Examples of the organic compound which may serve as a raw material of the carbon fiber include organic compounds such as toluene, benzene, naphthalene, ethylene, acetylene, and ethane; gasses such as natural gas and carbon monoxide; and mixtures thereof. Of these, aromatic hydrocarbons such as toluene and benzene are preferred.

An organo-transition metallic compound contains a transition metal serving as a catalyst, and is an organic compound containing, as a transition metal, a metal belonging to Group IVa, Va, VIa, VIIa, or VIII of the periodic table. An organo-transition metallic compound such as ferrocene or nickelocene is preferred.

The carbon fiber is produced through the following procedure: the aforementioned organic compound and organo-transition metallic compound are gasified; the thus-gasified compounds are mixed with a reducing gas (e.g., hydrogen) which has been heated to 500 to 1,300° C.; and the resultant mixture is fed to a reaction furnace heated to 800 to 1,300° C., to thereby allow reaction to proceed.

In the carbon fiber, preferably, the interlayer distance ($d_{002}$) of carbon hexagonal network layers (002) as measured through X-ray diffraction is at least 0.345 nm, and the ratio of peak height (Id) at a band of 1,341 to 1,349 $cm^{-1}$ of a Raman spectrum of the carbon fiber to peak height (Ig) at a band of 1,570 to 1,578 $cm^{-1}$ of the Raman spectrum; i.e., Id/Ig, is at least 1. Id is the height of a broad peak corresponding to increased disturbance of a carbon structure, and Ig is the height of a relatively sharp peak related to a complete graphite structure.

A raw material to be ground is preferably fired carbon fiber which is obtained by thermally treating, at 900 to 1,300° C., carbon fiber produced through thermal decomposition in order to remove an organic substance (e.g., tar) deposited onto the surface of the carbon fiber.

When the carbon fiber is ground, for example, a high-speed rotation mill, a ball mill, a medium stirring mill, or a jet mill may be employed. Preferably, the carbon fiber is ground by use of a vibration ball mill employing impact force, such as a circular vibration mill, a revolution vibration mill, or a centrifugation mill. Examples of grinding media which may be employed include ceramic balls formed of, for example, alumina, zirconia, or silicon nitride; and metallic balls formed of, for example, stainless steel. Of these, stainless balls, which can be removed through high-temperature heat treatment, are preferred. Grinding conditions for the grinding of the vapor grown fibers may vary in accordance with the type of grinding apparatus to be employed and the desired length of the fibers to be obtained, but preferably grinding conditions are determined so as to obtain a carbon fiber having a length of 2 to 25,000 nm.

When the carbon fiber is subjected to dry grinding performed in the presence of neither water nor an organic solvent, processes subsequent to grinding of the carbon fiber, including removal of a dispersant, drying of a solvent, and fragmentation of dried and agglomerated carbon fibers, are not required. Therefore, after grinding of the carbon fiber, heat treatment (at 2,000 to 3,500° C.) can be carried out efficiently.

In order to remove defects of the thus-ground fine carbon fiber and enhance crystallinity of the carbon fiber, the fine carbon fiber is subjected to heat treatment at 2,000 to 3,500° C. in an inert atmosphere. In order to further enhance crystallinity and improve electrical conductivity, the fine carbon fiber may be mixed with a boron compound such as boron carbide ($B_4C$), boron oxide ($B_2O_3$), elemental boron, boric acid ($H_3BO_3$), or a borate, and then subjected to heat treatment at 2,000 to 3,500° C. in an inert atmosphere.

No particular limitation is imposed on the amount of a boron compound added to the ground fine carbon fiber, since the amount varies in accordance with chemical properties and physical properties of the boron compound. For example, when boron carbide ($B_4C$) is employed, the amount of boron carbide is 0.05 to 10 mass %, preferably 0.1 to 5 mass %, on the basis of the entirety of the ground fine carbon fiber. Through heat treatment in the presence of the boron compound, the graphitized fine carbon fiber exhibits improved electrical conductivity, along with improved carbon crystallinity (interlayer distance $d_{002}$).

Any heat treatment furnace may be employed, so long as the furnace can maintain a predetermined temperature of at least 2,000° C., preferably at least 2,300° C. A typically employed furnace, such as an Acheson furnace, a resistance furnace, or a high-frequency furnace, may be employed. In some cases, carbon powder or carbon fiber may be heated through direct application of electricity.

Heat treatment is carried out in a non-oxidative atmosphere, preferably in an atmosphere of one or more rare gasses such as argon, helium, and neon. From the viewpoint of productivity, heat treatment is preferably carried out within a short period of time. When carbon fiber is heated over a long period of time, the carbon fiber is sintered to form aggregate, resulting in low production yield. Therefore, after the center of a compressed body of carbon fiber is heated to a target temperature, the compressed body of carbon fiber is not necessarily maintained at the temperature for more than one hour. The bulk density of carbon fiber immediately after the reaction is very small, such as, for example, about 0.02 $g/cm^3$, and if such carbon fiber is heat-treated as it is, the efficiency is very low in view of the process and also the treatment is difficult. For performing the heat treatment with good efficiency, the carbon fiber can be compressed by a press to form a compressed powder body of carbon fiber having a bulk density of about 0.2 g/cm$^3$, and it is the compressed body that is subjected to the heat treatment.

The graphitized fine carbon fiber of the present invention may be incorporated into a battery electrode or applied onto an electrically conductive substrate, to thereby improve performance of the resultant battery. Examples of the battery include batteries which require improved electrical conductivity of electrodes and require performance of intercalation, such as a lithium battery, a lead storage battery, a polymer battery, and a dry battery.

By virtue of its high electrical conductivity, when the graphitized fine carbon fiber of the present invention is employed in such a battery, the electrical conductivity of the resultant battery can be enhanced. When the graphitized fine carbon fiber is employed as a negative electrode carbon material in a lithium battery, the charge/discharge capacity of the battery can be increased, since the fine carbon fiber exhibits high intercalation performance by virtue of its internal or surface structure.

A propylene-carbonate-based electrolytic solution is known to be decomposed by graphite during charging. However, when the graphitized fine carbon fiber of the present invention is employed in a battery containing such an electrolytic solution, decomposition of the electrolytic solution can be suppressed, since each carbon fiber has an end surface including reduced dangling bonds. Meanwhile, an ethylene-carbonate-based electrolytic solution is known to undergo virtually no decomposition by graphite. Therefore, when the graphitized fine carbon fiber of the present invention is employed in a battery containing such an electrolytic solution, the electrolytic solution undergoes virtually no decomposition.

The amount of the graphitized fine carbon fiber incorporated into an electrode is preferably 0.1 mass % to 20 mass % inclusive, more preferably 0.5 to 20 mass %, much more preferably 1 to 15 mass %. When the incorporation amount exceeds 20 mass %, the packing density of carbon in the electrode is lowered, thereby lowering the charge/discharge capacity of the resultant battery. In contrast, when the incorporation amount is less than 0.1 mass %, the effect of the graphitized fine carbon fiber is lowered.

When an electrode; for example, a negative electrode of a lithium battery, is formed from the graphitized fine carbon fiber of the present invention, the carbon fiber and a binder are added to a carbonaceous material such as graphite powder, mesophase carbon micro beads (MCMB), or graphitized pitch-based carbon fiber, and the resultant mixture is sufficiently kneaded such that the carbon fiber is dispersed in the mixture as uniformly as possible.

EXAMPLES

The present invention will next be described in more detail by way of Examples, which should not be construed as limiting the invention thereto.

In order to calculate the amount of branched carbon fiber (mass %), a transmission electron micrograph (TEM) of a cross section of carbon fiber was used to calculate the ratio of the cross-sectional area of the branched carbon fiber to the total cross-sectional area of the carbon fiber, on the assumption that the branched carbon fiber and the carbon fiber have the same specific gravity.

Example 1

Non-graphitized, fired vapor grown carbon fiber (60 g) which had undergone heat treatment at 1,200° C. in an argon atmosphere for one hour, the carbon fiber having an average diameter of 180 nm, an average length of 10,000 nm, and an aspect ratio of 556 and containing branched vapor grown carbon fiber in an amount of 30 mass %, and stainless-steel balls having a diameter of 10 mm were placed in a stainless-steel container (capacity: 2,000 cm$^3$), and the carbon fiber was subjected to grinding treatment by use of a vibration mill (model: MB1, product of Chuo Kakohki Co., Ltd.) for 10 minutes. Thereafter, the thus-ground carbon fiber was subjected to heat treatment at 2,800° C. in an argon gas atmosphere for one hour. The thus-ground and graphitized carbon fiber was observed under a scanning electron microscope and a transmission electron microscope, micrographs of the carbon fiber were taken, and the lengths of 1,000 fibers were measured by use of a vernier caliper, to thereby obtain the distribution of the lengths. In addition, the bulk density, compressed specific resistance at 0.8 g/cm$^3$, and ash content of the carbon fiber were measured.

As a result, a graphitized fine carbon fiber having an average diameter of 180 nm, an average length of 3,420 nm, and an aspect ratio of 19 was produced. In this case, the standard deviation was found to be 11.

The above-ground and graphitized carbon fiber was found to have a bulk density of 0.24 g/cm$^3$, a compressed specific resistance of 0.16 Ω·cm, and an ash content of 0.04 mass %.

Example 2

Non-graphitized, fired vapor grown carbon fiber (60 g) which had undergone heat treatment at 1,200° C. in an argon atmosphere for one hour, the carbon fiber having an average diameter of 180 nm, an average length of 10,000 nm, and an aspect ratio of 556 and containing branched vapor grown carbon fiber in an amount of 30 mass %, and stainless-steel balls having a diameter of 10 mm were placed in a stainless-steel container (capacity: 2,000 cm$^3$), and the carbon fiber was subjected to grinding treatment by use of a vibration mill (model: MB1, product of Chuo Kakohki Co., Ltd.) for 40 minutes. Thereafter, the thus-ground carbon fiber was subjected to heat treatment at 2,800° C. in an argon gas atmosphere for one hour. The thus-ground and graphitized carbon fiber was observed under a scanning electron microscope and a transmission electron microscope, micrographs of the carbon fiber were taken, and the lengths of 1,000 fibers were measured by use of a vernier caliper, to thereby obtain the distribution of the lengths. In addition, the bulk density, compressed specific resistance at 0.8 g/cm$^3$, and ash content of the carbon fiber were measured.

As a result, a graphitized fine carbon fiber having an average diameter of 180 nm, an average length of 1,260 nm, and an aspect ratio of 7 was produced. In this case, the standard deviation was found to be 3.

The above-ground and graphitized carbon fiber was found to have a bulk density of 0.44 g/cm$^3$, a compressed specific resistance of 0.27 Ω·cm, and an ash content of 0.05 mass %.

Example 3

Non-graphitized, fired vapor grown carbon fiber (60 g) which had undergone heat treatment at 1,200° C. in an argon atmosphere for one hour, the carbon fiber having an average diameter of 180 nm, an average length of 10,000 nm, and an aspect ratio of 556 and containing branched vapor grown carbon fiber in an amount of 30 mass %, and stainless-steel balls having a diameter of 10 mm were placed in a stainless-steel container (capacity: 2,000 cm$^3$), and the carbon fiber was subjected to grinding treatment by use of a vibration mill (model: MB1, product of Chuo Kakohki Co., Ltd.) for 130 minutes. Thereafter, the thus-ground carbon fiber was subjected to heat treatment at 2,800° C. in an argon gas atmosphere for one hour. The thus-ground and graphitized carbon fiber was observed under a scanning electron microscope and a transmission electron microscope, micrographs of the carbon fiber were taken, and the lengths of 1,000 fibers were measured by use of a vernier caliper, to thereby obtain the distribution of the lengths. In addition, the bulk density, compressed specific resistance at 0.8 g/cm$^3$, and ash content of the carbon fiber were measured.

As a result, a graphitized fine carbon fiber having an average diameter of 180 nm, an average length of 540 nm, and an aspect ratio of 3 was produced. In this case, the standard deviation was found to be 1.

The above-ground and graphitized carbon fiber was found to have a bulk density of 0.57 g/cm$^3$, a compressed specific resistance of 0.28 Ω·cm, and an ash content of 0.06 mass %.

Example 4

Non-graphitized, fired vapor grown carbon fiber (60 g) which had undergone heat treatment at 1,200° C. in an argon atmosphere for one hour, the carbon fiber having an average diameter of 180 nm, an average length of 10,000 nm, and an aspect ratio of 556 and containing branched vapor grown carbon fiber in an amount of 30 mass %, and stainless-steel balls having a diameter of 10 mm were placed in a stainless-steel container (capacity: 2,000 cm$^3$), and the carbon fiber was subjected to grinding treatment by use of a vibration mill (model: MB1, product of Chuo Kakohki Co., Ltd.) for 40 minutes. Thereafter, the thus-ground carbon fiber was mixed with boron carbide (2 mass %), and the resultant mixture was subjected to heat treatment at 2,800° C. in an argon gas atmosphere for one hour. The thus-ground and graphitized carbon fiber was observed under a scanning electron microscope and a transmission electron microscope, micrographs of the carbon fiber were taken and the lengths of 1,000 fibers were measured by use of a vernier caliper, to thereby obtain the distribution of the lengths. In addition, the bulk density, compressed specific resistance at 0.8 g/cm$^3$, and ash content of the carbon fiber were measured.

As a result, a graphitized fine carbon fiber having an average diameter of 180 nm, an average length of 1,260 nm, and an aspect ratio of 7 was produced. In this case, the standard deviation was found to be 3.

The carbon fiber which had been produced through grinding, incorporation of the boron compound, and graphitization was found to have a bulk density of 0.44 g/cm$^3$, a compressed specific resistance of 0.17 Ω·cm, and an ash content of 0.20 mass %.

Comparative Example 1

Graphitized vapor grown carbon fiber (60 g) which had undergone heat treatment at 2,800° C. in an argon atmosphere for one hour, the carbon fiber having an average diameter of 180 nm, an average length of 10,000 nm, and an aspect ratio of 556 and containing branched vapor grown carbon fiber in an amount of 30 mass %, and stainless-steel balls having a diameter of 10 mm were placed in a stainless-steel container (capacity: 2,000 cm$^3$), and the carbon fiber was subjected to grinding treatment by use of a vibration mill (model: MB1, product of Chuo Kakohki Co., Ltd.) for 90 minutes. The thus-ground graphitized carbon fiber was observed under a scanning electron microscope and a transmission electron microscope, micrographs of the carbon fiber were taken, and the lengths of 1,000 fibers were measured by use of a vernier caliper, to thereby obtain the distribution of the lengths. In addition, the bulk density, compressed specific resistance at 0.8 g/cm$^3$, and ash content of the carbon fiber were measured.

As a result, a graphitized fine carbon fiber having an average diameter of 180 nm, an average length of 1,800 nm, and an aspect ratio of 10 was produced. In this case, the standard deviation was found to be 4.

The above-ground graphitized carbon fiber was found to have a bulk density of 0.35 g/cm$^3$, a compressed specific resistance of 0.56 Ω·cm, and an ash content of 1.50 mass %.

TABLE 1

| | Example 1 | Example 2 | Example 3 | Example 4 | Comparative Example 1 |
|---|---|---|---|---|---|
| Grinding time (minutes) | 10 | 40 | 130 | 40 | 90 |
| Aspect ratio | 19 | 7 | 3 | 7 | 10 |
| Shape of end surface | Bent portion of graphene sheets | Bent portion of graphene sheets | Bent portion of graphene sheets | Bent portion of graphene sheets | No bent portion of graphene sheets |
| Bulk density (g/cm$^3$) | 0.24 | 0.44 | 0.57 | 0.44 | 0.35 |
| Compressed specific resistance (Ω·cm) | 0.16 | 0.27 | 0.28 | 0.17 | 0.56 |
| d002 (nm) | 0.338 | 0.338 | 0.338 | 0.337 | 0.340 |
| Ash content (mass %) | 0.04 | 0.05 | 0.06 | 0.20 | 1.50 |

When fired vapor grown carbon fiber is ground by use of a vibration mill, and the thus-ground carbon fiber is subjected to graphitization through high-temperature heat treatment, rearrangement of graphene sheets occurs at an end surface of the resultant graphitized fine carbon fiber, the end surface being produced through grinding of the carbon fiber, and defects contained in the surface and the interior of the fiber are reduced. When heat treatment is carried out after grinding of the carbon fiber, the concentration of impurities contained in the resultant graphitized fine carbon fiber is reduced.

When fired vapor grown carbon fiber is ground, the thus-ground carbon fiber is mixed with a boron compound, and the resultant mixture is subjected to graphitization, the resultant graphitized fine carbon fiber exhibits high crystallinity, and has a compressed specific resistance lower than that of a graphitized fine carbon fiber which is produced without addition of a boron compound.

When graphitized vapor grown carbon fiber is ground by use of a vibration mill, defects are generated in the crystal structure of the resultant graphitized fine carbon fiber, and the fine carbon fiber exhibits increased compression specific resistance as a result of an increase in contact resistance between individual fine carbon fibers. Furthermore, the graphitized fine carbon fiber contains large amounts of impurities (ash) attributed to wear of grinding media.

Example 5

The graphitized fine carbon fiber of Example 2, which had been produced by grinding fired vapor grown carbon fiber by use of a vibration mill for 40 minutes, and thermally treating the thus-ground carbon fiber at 2,800° C. in an inert atmosphere for one hour, was mixed with a phenol resin at a ratio of 40:60, and the viscosity (cP or mPa·s) of the resultant mixture was measured at 25° C. by use of a viscometer through a method as specified by JIS K7117. The results are shown in Table 2.

Example 6

The graphitized fine carbon fiber of Example 4, which had been produced by grinding fired vapor grown carbon fiber by use of a vibration mill for 40 minutes, adding boron carbide (2 mass %) to the thus-ground carbon fiber, and thermally treating the resultant mixture at 2,800° C. in an inert atmosphere for one hour, was mixed with a phenol resin at a ratio of 40:60, and the viscosity (cP or mPa·s) of the resultant mixture was measured at 25° C. by use of a viscometer through a method as specified by JIS K7117. The results are shown in Table 2.

Comparative Example 2

The graphitized fine carbon fiber of Comparative Example 1, which had been produced by grinding graphitized vapor grown carbon fiber by use of a vibration mill for 90 minutes, was mixed with a phenol resin at a ratio of 40:60, and the viscosity (cP or mPa·s) of the resultant mixture was measured at 25° C. by use of a viscometer through a method as specified by JIS K7117. The results are shown in Table 2.

TABLE 2

| Sample | | Viscosity (cP) |
|---|---|---|
| Example 5 | Graphitized fine carbon fiber: phenol resin = 40 mass %: 60 mass % | 25 |
| Example 6 | Graphitized fine carbon fiber: phenol resin = 40 mass %: 60 mass % | 20 |
| Comparative Example 2 | Graphitized fine carbon fiber: phenol resin = 40 mass %: 60 mass % | 50 |

The viscosity of a compound prepared through mixing a phenol resin with the graphitized fine carbon fiber (filler) produced by grinding fired vapor grown carbon fiber and graphitizing the thus-ground carbon fiber is ½ or less the viscosity of a compound prepared through mixing a phenol resin with the graphitized fine carbon fiber (filler) produced by grinding graphitized vapor grown carbon fiber. The graphitized fine carbon fiber produced by grinding fired vapor grown carbon fiber, adding boron carbide to the thus-ground carbon fiber, and graphitizing the resultant mixture exhibits improved handling.

While the invention has been described in detail and with reference to specific embodiments thereof, it will be apparent to one skilled in the art that various changes and modifications can be made therein without departing from the spirit and scope thereof.

This application is based on Japanese Patent Application No. P2002-250169 filed Aug. 29, 2002, incorporated herein by reference in its entirety.

What is claimed is:

1. A graphitized fine carbon fiber comprising a hollow space extending along its center axis, and a plurality of graphene sheets, wherein the fiber has an end surface comprising a portion of discontinuity in which ends of graphene sheets are not bonded to one another and at least one portion of continuity comprised of at least one group of graphene sheets in which one graphene sheet is bonded to another graphene sheet adjacent thereto; and
wherein the portion of continuity comprises a bent portion formed of at least three of said groups.

2. A graphitized fine carbon according to claim 1, wherein the portion of continuity is present at the periphery of the fiber.

3. A graphitized fine carbon fiber according to claim 1, wherein, at the end surface of the fiber, the area of a region formed of the portion of discontinuity is smaller than that of a region formed of the portion of continuity.

4. A graphitized fine carbon fiber according to claim 1, wherein the fiber has a BET specific surface area of at least 4 m$^2$/g, an outer diameter of 2 to 500 nm, and an aspect ratio of 1 to 50.

5. A graphitized fine carbon fiber according to claim 1, wherein the fiber has at least one region at which the hollow space is partially closed.

6. A graphitized fine carbon according to claim 1, wherein the fiber contains boron or a boron compound between carbon crystal layers or on a carbon crystal layer, and the ratio of peak height (Id) at a band 1,341 to 1,349 cm$^{-1}$ of a Raman spectrum of the fiber to a peak height (Ig) at a band of 1,570 to 1,578 cm$^{-1}$ of the Raman spectrum is 0.1 to 1.

7. A graphitized fine carbon fiber according to claim 6, wherein the fiber contains boron (B) between carbon crystal layers in an amount of 0.01 to 5 mass%.

8. A method for producing a graphitized fine carbon fiber as recited in claim 1, which comprises grinding carbon fiber in which the interlayer distance (d002) of carbon hexagonal network layers (002) as measured through X-ray diffraction is at least 0.345 nm, and the ratio of peak height (Id) at a band of 1,341 to 1,349 cm$^{-1}$ of a Raman spectrum of the carbon fiber to peak height (Ig) at a band of 1,570 to 1,578 cm$^{-1}$ of the Raman spectrum is at least 1; and thermally treating the thus-ground carbon fiber at a temperature of 2,000 to 3,000° C. in an inert gas atmosphere.

9. A method for producing a graphitized fine carbon fiber as recited in claim 1, which comprises grinding vapor grown carbon fiber produced through thermal decomposition of hydrocarbon, or carbon fiber obtained through heat treatment of the vapor grown carbon fiber at a temperature of 600 to 1,300° C. in an inert gas atmosphere; and thermally treating the thus-ground carbon fiber at a temperature of 2,000 to about 3,000° C in an inert gas atmosphere.

10. A method for producing a graphitized fine carbon fiber according to claim 8, wherein the carbon fiber is ground by means of impact grinding employing impact force and dry grinding performed in the presence of neither water nor an organic solvent.

11. A method for producing a graphitized fine carbon fiber according to claim 9, wherein the carbon fiber is ground by means of impact grinding employing impact force and dry grinding performed in the presence of neither water nor an organic solvent.

12. A method for producing a graphitized fine carbon fiber according to claim 9, wherein the vapor grown carbon fiber contains branched vapor grown carbon fiber, and the vapor grown carbon fiber has an outer diameter of 2 to 500 nm and an aspect ratio of 10 to 15,000.

13. A method for producing a graphitized fine carbon fiber according to claim 10, wherein the vapor grown carbon fiber contains branched vapor grown carbon fiber, and the vapor grown carbon fiber has an outer diameter of 2 to 500 nm and an aspect ratio of 10 to 15,000.

14. A method for producing a graphitized fine carbon fiber according to claim 11, wherein the vapor grown carbon fiber contains branched vapor grown carbon fiber, and the vapor grown carbon fiber has an outer diameter of 2 to 500 nm and an aspect ratio of 10 to 15,000.

15. A method for producing a graphitized fine carbon fiber according to claim 8, wherein, when the carbon fiber is thermally treated at a temperature of about 2,000 to 3,000° C. in an inert gas atmosphere, a boron compound is added to the carbon fiber.

16. A method for producing a graphitized fine carbon fiber according to claim 9, wherein, when the carbon fiber is thermally treated at a temperature of 2,000 to about 3,000° C. in an inert gas atmosphere, a boron compound is added to the carbon fiber.

17. A graphitized fine carbon fiber mixture comprising a graphitized fine carbon fiber as recited in claim 1, in an amount of 5 vol % to about 90 vol % on the basis of the entirety of the mixture.

18. A graphitized fine carbon fiber composition comprising a graphitized fine carbon fiber as recited in claim 1.

19. A graphitized fine carbon fiber composition comprising a graphitized fine carbon as recited in claim 1, in an amount of 5 to about 90 mass %, the composition being a resin composition.

20. An electrically conductive material comprising a graphitized fine carbon fiber composition as recited in claim 18 or 19.

21. A secondary battery comprising, as an electrode material, a graphitized fine carbon fiber composition as recited in claim 18 or 19.

22. A gas occlusion material comprising a graphitized fine carbon fiber composition as recited in claim 18 or 19.

* * * * *